(12) United States Patent
Feher et al.

(10) Patent No.: US 7,122,772 B2
(45) Date of Patent: Oct. 17, 2006

(54) MICROWAVE RESONATOR AND METHOD OF OPERATING MICROWAVE RESONATOR

(75) Inventors: Lambert Feher, Stutensee (DE); Volker Nuss, Hergesweiher (DE); Thomas Seitz, Dettenheim (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 0 days.

(21) Appl. No.: 11/323,650

(22) Filed: Dec. 30, 2005

(65) Prior Publication Data

US 2006/0108360 A1    May 25, 2006

Related U.S. Application Data

(63) Continuation-in-part of application No. PCT/EP2004/004516, filed on Apr. 29, 2004.

(30) Foreign Application Priority Data

Jul. 1, 2003    (DE) .................. 103 29 411

(51) Int. Cl.
*H05B 6/70*    (2006.01)
*H05B 6/72*    (2006.01)

(52) U.S. Cl. ............ 219/697; 219/696; 219/746; 219/750; 219/756; 333/230

(58) Field of Classification Search ........ 219/695–697, 219/745–750, 756, 762; 333/230, 227
See application file for complete search history.

(56) References Cited

U.S. PATENT DOCUMENTS

| 4,562,409 | A |   | 12/1985 | Saito et al. |
|---|---|---|---|---|
| 5,532,462 | A | * | 7/1996 | Butwell et al. ............. 219/695 |
| 5,834,744 | A |   | 11/1998 | Risman |
| 6,072,168 | A |   | 6/2000 | Feher et al. |
| 6,163,020 | A | * | 12/2000 | Bartusch et al. ............ 219/756 |

FOREIGN PATENT DOCUMENTS

| DE | 196 33 245 | 11/1997 |
|---|---|---|
| DE | 197 00 140 | 7/1998 |

* cited by examiner

*Primary Examiner*—Philip H. Leung
(74) *Attorney, Agent, or Firm*—Klaus J. Bach (57) ABSTRACT

In an even numbered polygonal microwave resonator wherein a high mode microwave mode is formed and in the resonator volume a homogeneous field distribution is established for the thermal processing of workpieces, a microwave in-coupling structure pair is provided along a joining edge of two wall segments alternately at opposite sides and the in-coupling structure pairs or in communication, via a rectangular microwave guide channel, with a microwave sources supplying microwaves to the in-coupling structure pairs so that the microwaves entering the resonator from each in-coupling structure are directed toward an opposite corner area of the resonator and are reflected from the opposite corner area back into the center area of the resonator in the form of separate beams.

9 Claims, 6 Drawing Sheets

MICROWAVE RESONATOR AND METHOD OF OPERATING MICROWAVE RESONATOR

This is a continuation-in-part application of international application PCT/EP2004/004516 filed Apr. 29, 2004 and claiming the priority of German application 103 29 411.2 filed Jul. 1, 2003.

BACKGROUND OF THE INVENTION

The invention resides in a microwave resonator, a modular plant/assembly line build up by such a microwave resonator, a method and work pieces thermally processed in accordance with the method by means of microwaves which are generated in a high-mode resonator.

The heating of food by microwaves is well-known. An electromagnetic field coupled into a resonator chamber immediately assumes a stationary distribution in the chamber which depends on the frequency of the microwave, that is its wavelength, and the geometry of the resonator chamber. The household microwave has a frequency of 2.45 GHz, that is, a wavelength $\lambda$ of about 12 cm in a space filled with air or in a vacuum. The geometry of microwave apparatus for households resides therefore in a simple cubic configuration in those dimensions.

Experience has shown, that food exposed to microwaves in the resonator chamber is not uniformly heated. This depends on different water contents of the food components and consequently the existence of a locally different dipole density, but most importantly, on the distribution of the electromagnetic field in the resonator and consequently the excitation of the dipoles by the electromagnetic excitation field. During heating particularly of similar substances/materials the field distribution is of atmost importance for the uniform heating in the whole substance/material volume. A rough but effective aid in avoiding large spatial field variations is a movable surface area in the resonator chamber, where impinging parts of the microwave radiation are reflected so that field strength variations are localized but are blurred. In this case, the process material is stationary in the resonator. Another or additional measure resides in moving the process material, for example, on a rotating plate or a table which is moved back and forth.

In the industrial material processing technology, it is very important that, during the heating of the goods being processed by microwaves, the electromagnetic field varies in the whole resonator volume or at least in a central part of the resonator volume as little as possible so that it is close to an ideal spatially uniform distribution in order to avoid overheating and hot spots.

DE 196 33 245 discloses a polygonal resonator geometry into which radiation is coupled eccentrically from the front side thereof with an inclined radiation axis. Particularly with a hexagonal cross-section of the resonator geometry, in this way a field distribution is obtained, with which, at least in the central resonator area, a volume area is provided in which a usable field uniformity exists. Although an electromagnetic field is present in the whole interior of the resonator with the in-coupling of the microwave, the central process volume in which the field is homogeneous or in which the field variations are at least tolerable, is relatively small. This resonator with its type of in-coupling can only be used as individual resonator and is not usable as a modular part of a plant.

It is the object of the present invention to provide a resonator for a microwave to be coupled into the resonator, in which a mixture of multiple modes are formed in such a way that, in the resonator volume, an as large as possible process volume around the longitudinal resonator axis can be utilized for the thermal processing providing that the average field strength of the mode mixture approaches an ideal uniform distribution in this space.

Such a resonator should be usable as a module that is it should be usable in a setup of an assembly line for the thermal processing of workpieces by a serial arrangement of such resonators.

In addition, the resonators should each be operable with microwaves in such a way that, with a controllably predetermined frequency, the establishment of modes in the resonator by the in-coupling of microwaves oscillates locally or moves around the space.

With such a resonator it should be possible to process workpieces or objects on an industrial scale by the application of microwaves based on volumetric heating while saving time and energy, particularly resin-soaked compound materials, CFK and/or GFK should be uniformly cured to achieve high form stability and mechanical loading capacity, as well as to cement components and epoxy-resin coated structures.

SUMMARY OF THE INVENTION

In an even numbered polygonal microwave resonator wherein a high mode microwave mode is formed and in the resonator volume a homogeneous field distribution is established for the thermal processing of work pieces, a microwave in-coupling structure pair is provided along a joining edge of two wall segments alternately at opposite sides and the in-coupling structure pairs or in communication, via a rectangular microwave guide channel, with a microwave sources supplying microwaves to the in-coupling structure pairs so that the microwaves entering the resonator from each in-coupling structure are directed toward an opposite corner area of the resonator and are reflected from the opposite corner area back into the center area of the resonator in the form of separate beams.

The microwave resonator for the thermal processing of material has basically a form as known from DE 196 33 245 with a convex polygonal cross-section. The cross-section is uniform. However, it has been found by deliberations and calculations based thereon, that the even-numbered polygonality and at least hexagonality of the cross-section of such a microwave resonator is advantageous for a highly uniform field establishment with the in-coupling of microwaves into a large central volume area of the resonator. The resonator interior is simple and is never round. In addition to the two front walls, it has planar similar wall segments and consequently, has a uniform cross-section. Depending on the wavelength $\lambda$ of the microwaves coupled into the resonator, it has such dimensions that a high-mode electromagnetic field can be established.

A resonator is said to be high-mode or over-mode if the resonator diameter D is substantially larger than the wavelength $\lambda$, for example, 5 times as large, preferably 10 times as large or even more, if such a design is feasible, so that in accordance with the condition:

$$L^2+m^2+n^2=(D/\lambda)^2$$

a large number of anodes (l, m, n) can exist between the mode numbers l, m, n and the diameter D, which can be excited and which are superimposed and as a result, in an over-mode state.

The homogeneity or at least small spatial variation of the electromagnetic field in the large central volume area of the resonator interior is achieved largely by at least one incoupling structure pair for the microwave. The incoupling structures are similar.

In very large applicators, such an incoupling structure pair may consist of several wave conductor trains which uncouple axially in parallel. An outer longitudinal edge always extends between such an incoupling structure pair, which extends at most over the resonator length, or, respectively, the longitudinal outside edge. Several incoupling structure pairs are disposed in this way around the resonator circumference. Almost N incoupling structure pairs may be provided at the resonator circumference, wherein N is a natural number and indicates the polygonality.

Each in-coupling structure comprises a longitudinal arrangement of openings in the resonator housing wall above which the rectangular hollow conductor connected to the microwave source ends. This in-coupling structure in the housing area segment consists of a series of non-overlapping, equidistant in-coupling contours or openings, alternately arranged on the left and right along a straight line, that is, the guide line, which extends parallel to the associated longitudinal housing edge. The in-coupling contours or openings follow in spaced relationship such that a phase constant in-coupling into the resonator of the microwave present in the rectangular hollow conductor in the basis mode $TE_{01}$ is obtained, and the narrowest width d of the slots is determined from the condition for the diffraction angle $\Theta$ with a predetermined microwave length $\lambda$ from $\text{Tan } \Theta = \lambda/d$ This approximation is good for angles $\Theta<5°$; for angle $\Theta<2°$ the first member of the progression for the tangent is sufficient, that is $\Theta = \lambda/d_1$ The in-coupling contours have, on one hand, a width d in accordance with the diffraction angle mentioned above, depending on the first reflection distance L1 of the microwave in-coupled from the in-coupling structure in order to ensure a widening of the developing wave front in such a way that it widens sufficiently to be reflected at two intersecting oppositely arranged wall area segments. On the other hand, the diffraction angle is selected to small enough that the primary bundle in-coupled into the resonator does not cover the opposite in-coupling structure to avoid the back radiation. The split radiation beams formed after the primary reflection have a sense of rotation directed away from the wave conductor/in-coupling structure by which they are generated for further reflection and division and a corresponding noise-like but elastic and therefore loss-free straying.

With the utilization of the symmetrical in-coupling structure pairs, a uniform amplitude distribution via the outcoupling opening into the resonator directly in the Fresnel short range field is realized. The further free wave propagation with concurrent refraction widening is maintained. The wave front propagating from an in-coupling structure is multiple times elastically reflected by the flat metallic inner wall segments while maintaining its properties and while the various beams formed are continuously widened. The openings of the in-coupling structure or structures are arranged at the end of the wave conductor on the resonator wall and in-couple into the resonator in a phase-constant manner. On the basis of these considerations, the line is obtained along which the in-coupling slots are arranged with regard to the longitudinal housing axis. This design distance is determined on the basis of the above-mentioned microwave engineering requirements and is variable within limits.

If the in-coupling contours are arranged with their longitudinal axes parallel to the straight guide line, than the strongest microwave in-coupling into the resonator is provided for the respective in-coupling structure. If they extend normal to the guide line, the microwave in-coupling is lowest. An intermediate position provides for a wave in-coupling of intermediate strength.

In addition to the geometric position of the openings of the in-coupling structures of an in-coupling structure pair relative to one another, their geometric shape is also important for the quality of the formation of the electromagnetic field in the resonator.

For the manufacture, the most simple shape of the in-coupling contour is a rectangle with the width d and the length $L=\lambda/2$ of the base wave $H_{10}$ in the rectangular hollow conductor (claim 3). With this geometry, there are microwave-physically formed losses in the radiation supplied to the resonator, which is apparent form the stronger heating, Joule heating $R^2$, by edge currents particularly in the corner areas of the in-coupling contour.

An optimized simple in-coupling contour as defined in claim 4 follows over a length $L=\lambda/2$ of the base wavelength the course of two mirror inverted electrical field lines, that is, the E lines, of the base mode $TE_{01}$ in the wall of the rectangular hollow conductor at least approximately from knot to knot. In the anti-node, the two E field lines are spaced by the above-mentioned width for the infraction.

Theoretically any point-like radiation source consists of a series development of multi-pole radiators of successively increasing order, in the most simple case of a dipole radiator. From this a complicated form of the in-coupling contour can be derived which, remote from the radiation source approaches the ideal form of a predetermined multi-pole characteristic. The location of the openings of an in-coupling structure of the of in-coupling structure pair is also important for the formation of the field coupled into the resonator. Preferably, the relative arrangement is described. The location of the openings relative to one another are equidistant for achieving the phase consistency to be un-coupled and the distance of the openings from the guide line is such that an isotropic radiation in the reflected distant field is obtained.

In a particular arrangement according to the invention, wherein a mode mixer is installed along the wall edge straight line of the two radiation planes of an in-coupling structure pair which extends over the length wall section edge, two results are provided: first, for improving the field uniformity in a not ideal homogeneous field in the process volume of the resonator a rotating mode mixer is installed along the section line of the two radiation planes of an in-coupling pair, which extends at most over the length of the housing edge and which, second strays the center of the two in-coupled radiation herein from the in-coupling structure pair, so that none of the two radiation planes falls into an eventually opposite in-coupling structure. The mode stirrer should not permit any back reflection or almost no back reflection of the primary radiation bundle from the wave conductor back into the wave conductor. In any case, any such back reflection must be minimized. Therefore, the stirrer has an elliptical cross-section or a round cross-section with an alternate concave-convex contour wherein in the convex part, the curvature is such that the focal point does not fall into the in-coupling structure. In that case, only a line-shaped part of the impinging microwave beam would be reflected or even only a point-like part if the mode stirrer is additionally torsioned in the longitudinal direction.

Another solution of the present invention resides in the provision of a processing line. At least two microwave resonators are arranged adjacent each other with a passage therebetween such that objects to be processed can be moved from one resonator to the adjacent resonator via the abutting front walls. The resonators may be arranged in a straight line or at an angle or even meander-like, so that certain design conditions or limitations can be accommodated. With such a processing line, a large number of work pieces can be continuously thermally processed, for example, heated, kept at a certain temperature or cooled in a predetermined time frame or, respectively, in accordance with a desired curve. With continuous passage of the work pieces, the work pieces could be heated in the first resonator of the processing line, in the second resonator it could be kept woven over a predetermined period of time and in the third it could be cooled in a time-controlled manner.

Already with one in-coupling pair, a resonator has a large central process volume in which at least electromagnetic uniform field conditions exist, that is, there is a homogeneous field distribution. A work piece introduced into this process volume is subjected at each location to the same field conditions and is therefore uniformly heated all over. With a further in-coupling structure pair at the resonator, the field conditions are further homogenized with the in-coupling of microwaves into the resonator whereby operational possibilities are provided to influence the field distribution in a time-based oscillating fashion.

In another embodiment of the invention the microwaves are in-coupled via the in-coupling structure pairs of a resonator displaced with respect to each other while time-oscillating about a momentary or constant average value. As a result, the mode formation in the resonator oscillates locally or moves back and forth between two areas comparable to a kind of walking wave or it even circulates in the resonator volume. In this way, thermal fine adjustments in the work piece to be processed can be made. That is, with this method, a work piece disposed in the process volume can actually be homogenously heated or kept warm. Also, extremely high heating rates at highest temperature uniformity are possible with this method, since the phase-based field variations have extremely low temperature variations and therefore prevent the formation of hot spots or the possible so-called thermal runaway.

The type of mode movement can be controlled by means of the number in-coupling structure pairs at the resonator, since at the minimum one such pair is present at the resonator—up to the maximum number that can be provided at the longitudinal housing edges. The in-coupling of the whole electromagnetic energy into the resonator over N present in-coupling structure pairs is:

$$p(t) = \sum_{i=n}^{N^1} p_i(t)$$

$$N^1 \leq N$$

N is the polygonally of the resonator cross-section and $p_i(t)$ is the energy in-coupling at the $i^{th}$ in-coupling structure pair, $N^1$ and N are natural numbers.

p(t) is a given value; it may be timely constant or timely variable, that is, it may increase or decrease. p(t) is a sum of several values. It is apparent therefrom that the p(t) components of the installed or utilized structure pairs must change only oppositely in order to maintain the given value.

Transferred to the resonator operation, the type of in-coupling into the resonator wherein the overall energy input value p(t) is maintained is called "mode sweeping".

It is also possible that the energy in-coupling p(t) via the in-coupling structure pair I is predetermined, but the energy in-coupling $p_{right}(t)$ and $p_{left}(l)$ via the two in-coupling structures varies slightly in an oppositely oscillating manner. There is therefore additionally some sort of small mode sweeping:

$$P_1(t)=p_{right}(t)+p_{left}(t)$$

In this way, further fine-tuning in the homogeneous heat treatment is established. HEPHAISTOS makes the complete complex control possible.

The energy can be in-coupled by pulse width control or continuously by controlling the electron beam strength in the respective microwave source which supplies the microwave via a rectangular hollow conductor line at the end of the hollow conductor through the respective in-coupling structure.

All objects or work pieces and unfinished products which can be thermally processed and which can be produced or form-stabilized in a microwave resonator or in a process line. The unfinished products may be resin impregnated carbon fiber compound materials, CFK, resin-impregnated glass fiber compound materials, GFK, thermally curable resins as such and therefore thermally processible polymers, ceramics.

For the objects to be processed in the resonator, it is important for a uniform heating in the work-piece volume that they are exposed in the homogeneous field area or, respectively, in the field area with the smallest local variations. To this end, the resonator includes a support structure which is permanently installed therein or which can be removed for loading and inserted for the processing. It consists of a material which does not disturb the electromagnetic field and which is heat resistant. In the process volume area, that is, in the area of high field homogeneity, it may even be metallic. The reason herefor is that on the surface of the work piece introduced into the process volume the electric field lines extend with the given field situation normal or at least almost normal to the surface of the support structure so that no currents or only negligibly small currents are induced in the surface which have no detrimental influence on the process.

With such a microwave resonator design an axially symmetrical field homogeneity of high quality is obtained by superposition of numerous beam bundles which are propagated by multiple reflections and uniformly distributed. As a result, in the resonator volume, a centrally arranged large usable process volume is obtained.

Below the microwave resonator will be explained on the basis of an experimentally utilized embodiment shown in the accompanying drawings.

DESCRIPTION OF PARTICULAR EMBODIMENTS

For microwave technical applications, with a justifiable technical expenditure, the microwave range of 10 MHz to 30 GHz, preferably the range of 100 MHz to 25 GHz, the latter being equivalent to the wavelength in air/vacuum of about 33 cm to 1.2 cm is appropriate. In this band, many ranges are used for the communication in many ways so that, as a result, only the ISM frequencies 915 MHz, 2.45 GHz (household microwaves), 5.85 GHz and 24.15 GHz can be considered for utilization. Resonator geometries are adapted therefore to the associated wavelengths 32.8 cm, 12.2 cm, 5.1 cm and 1.2 cm.

In the present case, below the prismatic resonator with a uniform hexagonal cross-section and the process line derived therefrom will be described. The resonator is operated with 2.45 GHz. It includes such dimensions that in the resonator volume, the desired, above-mentioned high mode operation is formed with the 2.45 GHz microwave in-coupling. The resonator consists of stainless steel. In the exemplary embodiment, it is accessible via both front sides of the resonator which can be closed by doors because of the continuously observed/controlled heating of the resin impregnated compound materials being processed at the time. The heating is surveyed by thermal sensors which are not affected by the electromagnetic field and are disposed at different locations. In addition, the heating image of the object being processed may be constantly observed by a thermal camera. The heating process: Heating to the desired temperature, maintaining the temperature constant is controlled electronically by means of the heating control arrangement of the system with the designation HEPHAISTOS (High Electromagnetic Power Heating Autoclave InSeT Oven System).

Figure 2:
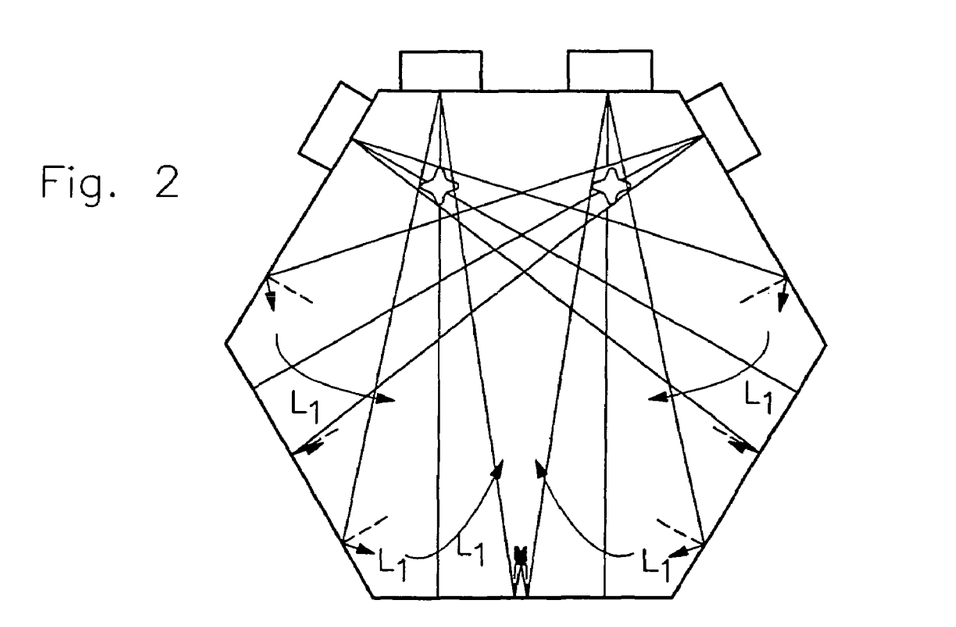
FIG. 2 shows the resonator cross-section with two in-coupling structure pairs.

FIG. 2 shows the cross-section of the resonator with an in-coupling pair 1, 11 arranged parallel to the upper left housing edge A. The undivided in-coupling structure comprises the rectangular hollow conductor which extends to the resonator at the outside thereof and is integrated with the resonator wall. It extends in the present case almost over the whole resonator length (see FIG. 4*b*). In the wall part common with the resonator the actual in-coupling structures are provided along the center line of the common wall part (see FIG. 3).

The radiation plane of each in-coupling structure extends normal to the adjacent housing wall segment. In accordance with the in-coupling structure, the beam volume at the main part thereof has an opening angle such that for the first reflection it is directed toward two housing wall segments which are disposed directly adjacent each other. In the arrangement as shown here in FIG. 1, starting from the housing cover wall segment the beam impinges on the opposite parallel bottom housing wall segment and the neighboring wall segment inclined thereto at a 60° angle. The microwave beam in-coupled into the resonator by the in-coupling structure arranged at the top side area inclined at a 60° angle provides for a corresponding beam path. The respective divergent inner wave beam is reflected by the planar wall segments and is widened. Small focus areas are formed along the resonator—like with round resonator walls.

Figure 1:
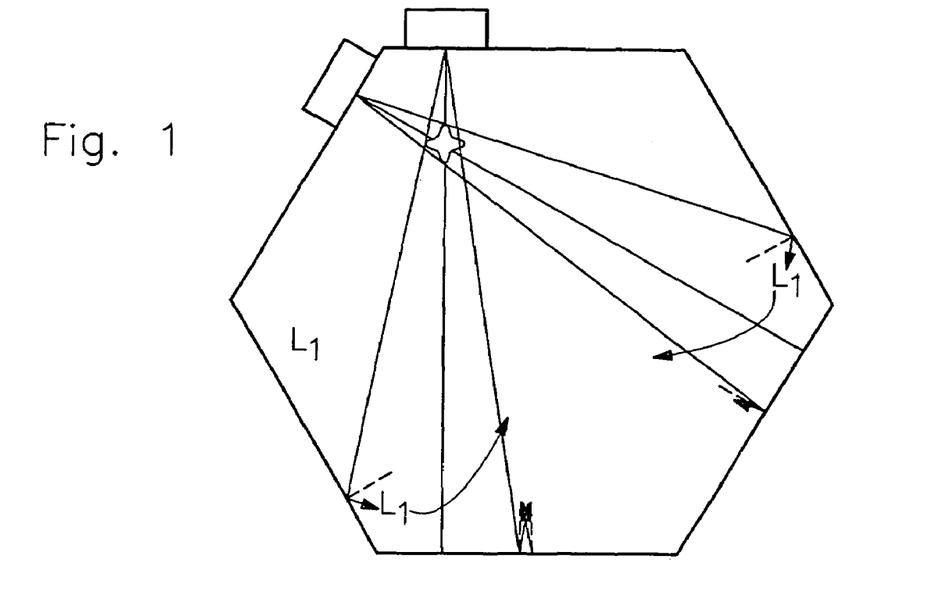
FIG. 1 shows the resonator cross-section with an in-coupling structure pair.

The small arrows shown at the beam edges and at the respective first reflection areas indicate the first reflection, the curved arrows indicate the sideways branching of the beam edges of the beam upon first reflection.

The mode stirrer is disposed in the area of intersection of the two not yet reflected main beam lobes. It extends almost over the whole free inner resonator length. It is supported for example on the two resonator front walls and is driven from the outside by way of a penetration in one of the front walls. If it is suitably electromagnetically shielded the electric drive may also be arranged in the interior of the resonator. The cross-section of the mode stirrer is shown here star-like rounded, that is, it provides alternately for four convex and concave contour sections. The mode stirrer as shown has a simple, that is, non-contorted configuration and fulfills the condition that, if at all, radiation is reflected back into the in-coupling structure only along a longitudinal line and only for a short period—depending on the rotational speed of the mode mixer. In any case, the central area of the two radiation lobes which reach the mode stirrer are strongly widened at the exposed envelope part.

FIG. 2 shown the resonator with two in-coupling structure pairs mounted to the outer resonator wall. The second incoupling structure pair is disposed at the longitudinal resonator housing edge of the common housing wall segment. Since the in-coupling structures are all of the same type, the beams extend in a corresponding way. And since all the microwave beam lobes are widening and are reflected by planar wall sections, the electromagnetic field distribution in the interior of the resonator becomes immediately quite uniform. With both mode mixers, the relatively high density of the microwave beam part which has just been coupled into the resonator and which impinges on the mode stirrer is widened in its density after reflection at the stirrer and is weakened and, because of the particular symmetry of the hexagon, is elastically reflected so that the field density becomes more uniform also in this way. The mode mixer is disposed on the line of the intersection of the two beam planes of the in-coupling pair and in this way, additionally avoids, in any case, that the two radiation planes extend to a respective opposite in-coupling structure.

Figure 3:
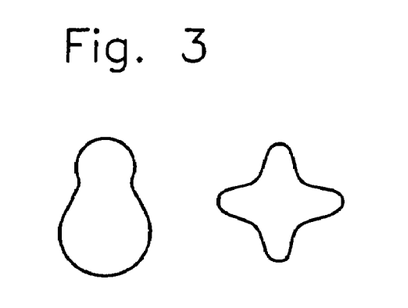
FIG. 3 shows an exemplary mode stirrer cross-section.

A mode mixer is useful in that it contributes to the field homogeneity. FIG. 3 shows two examples of a mode mixer cross-section, a star-like rounded and a keyhole-shaped mode mixer. In any case, the concave contour sections should not have a curvature radius that the focal line—a straight line for a longitudinal mixer, a thread line about the axis of the mode mixer for a torsional mixer—of this part falls onto the in-coupling structure but is disposed further behind. If the mode mixer has a convex cross-section, for example, lens-like or ellipsoid, this requirement does not exist.

Figure 4A:
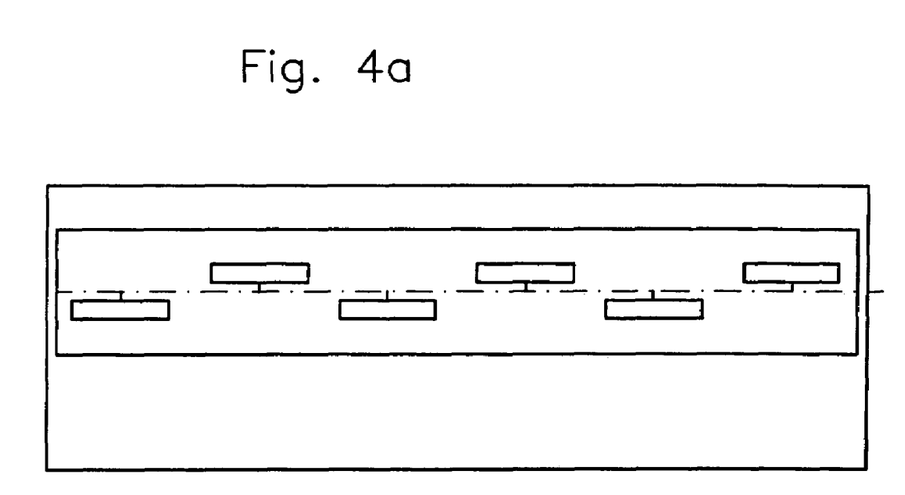
FIG. 4 shows the in-coupling structure.
Figure 4B:
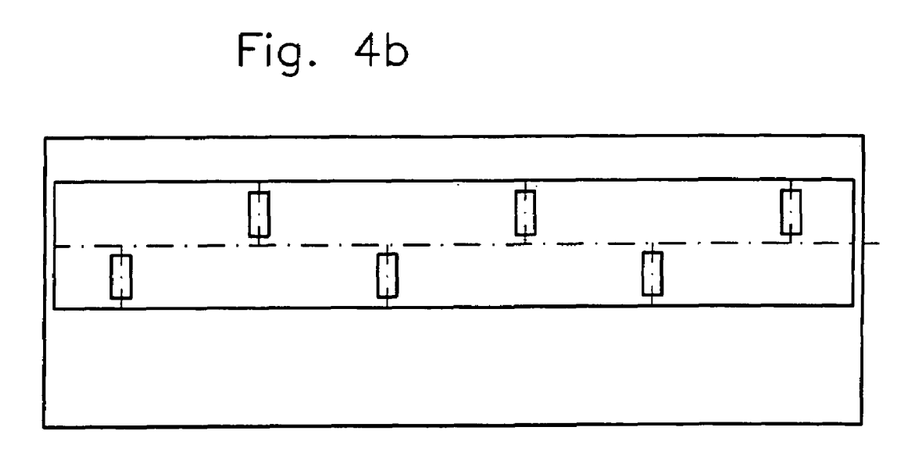

Precondition for achieving usable electromagnetic field conditions, in addition to the resonator geometry, is the structure of the in-coupling devices for the microwave. Calculation have shown, and experiments confirm, that with a structure as shown in FIG. 4 field homogeneity or at least a spatially tolerably small field variation can be achieved. The common wall section of the rectangular hollow conductor disposed on the outer wall and of the resonator wall has, at both sides of longitudinal center axis thereof, rectangular slot-like openings which are arranged evenly spaced over the length of the resonator. Based on this frequency of the microwave, in this case, the household microwave frequency v=2.45 GHz, the rectangular slots have a length of L=62.8 mm and a width d, which is determined by the diffraction conditions Tan $\Theta=\lambda/d$, or respectively, $\Theta=\lambda/d$ The dimensioning of the in-coupling contour however is not fixed, it is only exemplary. The in-coupling openings are spaced from one another such that a phase-constant out-coupling into the resonator is provided.

Figure 5:
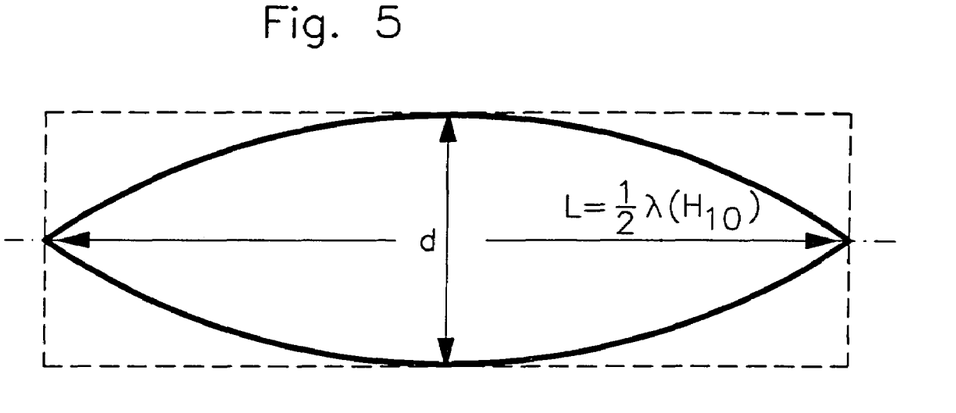
FIG. 5 shows an in-coupling contour adapted to the base mode.

FIG. 5 shows a simple in-coupling contour which considers the microwave physical conditions. In the area of the resonator wall above which the rectangular hollow conductor ends, the in-coupling contours of the in-coupling structure are so-shaped that the base mode $TE_{10}$ is favored by the form of the respective in-coupling contour. The contour follows two E-field lines of the base mode in the wall of the rectangular hollow conductor which are mirror-reversed with respect to the longitudinal axes of the in-coupling contour. The two nodes of the E-field lines are disposed on this longitudinal axis; they are spaced by $\lambda/2$ of the base wavelength and form the end of the in-coupling contour. The loop of the in-coupling contour has the width d considering the diffraction angle of the in-coupling into the resonator. Along exactly this contour, the situation $E_1=0$ exists. This contour is geometrically simple; it can be easily cut out of the resonator wall using modern metal working machines. In-coupling contours with more complex shapes based on the setup of a multi-member serially developed radiation source are basically possible but should be examined as to whether they are economical for the particular technical application.

Figure 6A:
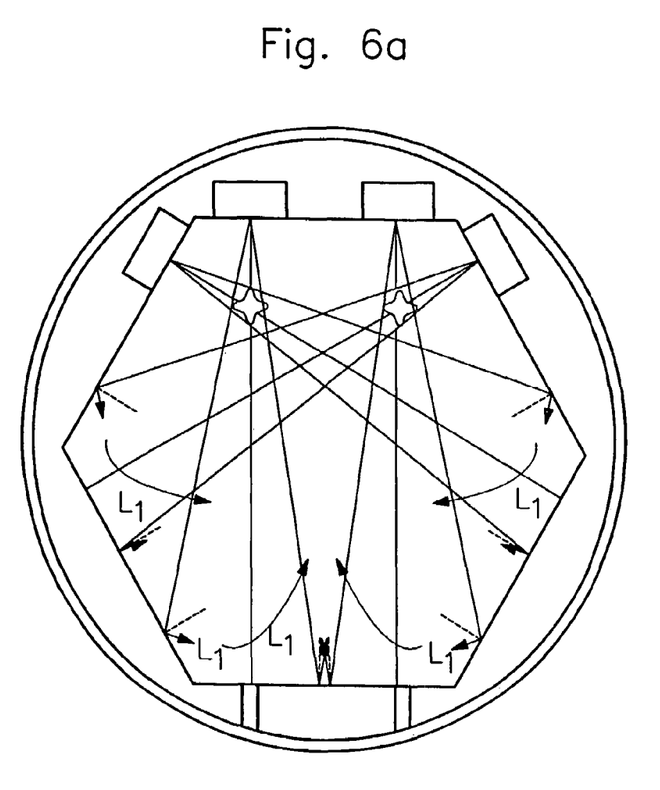
FIG. 6a shows the resonator in an autoclave—transverse cross-section.
Figure 6B:
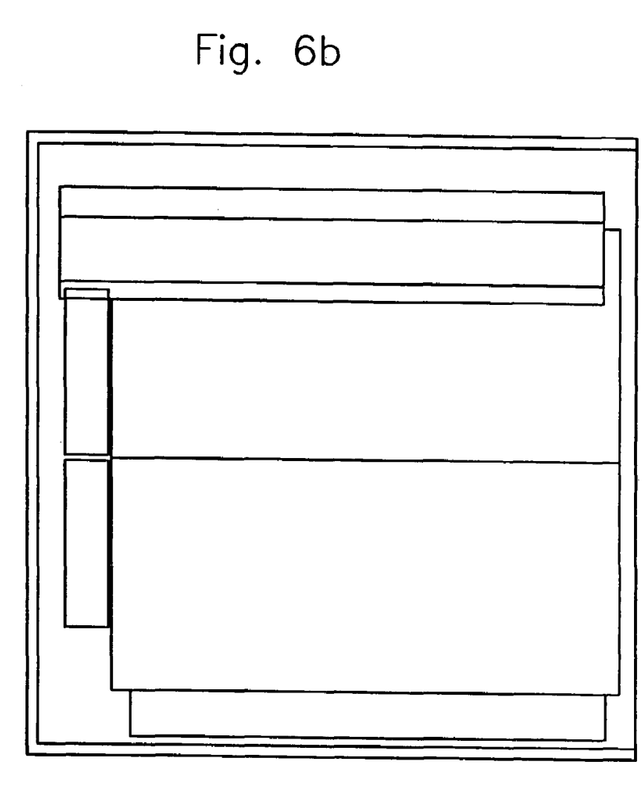
FIG. 6*b* shows the resonator in the autoclave—longitudinal cross-section.

FIGS. 6a to 6b show a particular application or respectively design. The oven indicated here with a circular cross-section is for example an autoclave as it is known from conventional thermal processes. With a suitable design, it can be used in connection with vacuum process or pressure processes. Since such a conclave can be closed hermetically in such a way that it is also electromagnetically tight, a radio-technically static-free use ensured. The resonator, microwave-technically fully equipped, is moved into the autoclave on skids. It is releasably or firmly anchored in the autoclave depending on the overall process. The energy supply as well as the sensor and control cables for the control and surveillance of the process is provided via technically suitable penetrations in the autoclave and, as needed, also in the resonator. In the two FIG. 6a, cross-section, FIG. 6b, axial longitudinal cross-section, the simple technical transport solution of the skids or tracks is indicated. With a higher weight, the resonator is provided at its outer wall with lugs and/or hooks by way of which it can be moved using a crane.

Figure 7:
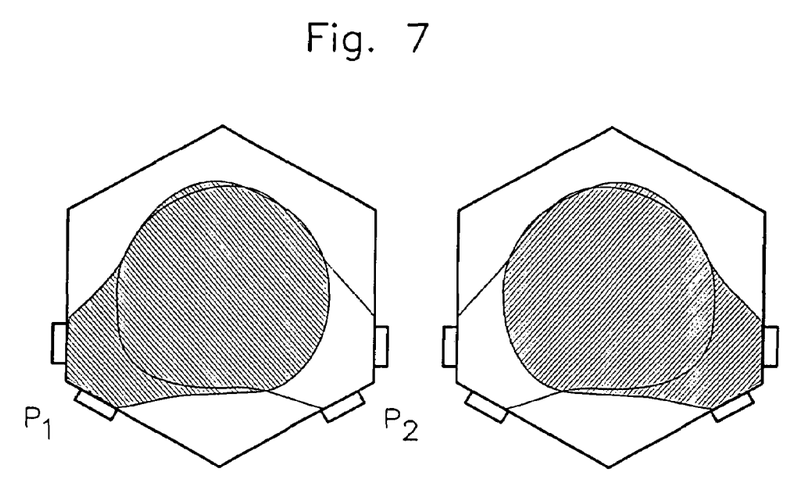
FIG. 7 shows mode sweeping.

FIG. 7 shows the mode sweeping for the most simple case of two in-coupling structure pairs. Microwaves are in-coupled via both pairs so that the central process volume which is shown here in cross-section, is formed. By the alternating oscillating in-coupling via the two in-coupling structure pairs for example the outward bending as indicated by the two contours extending in each case from one in-coupling structure pair move back and forth or circumferentially. In this case, the predetermined energy $P(t)=p_1(t)+p_2(t)$ is in-coupled.

Figure 8:
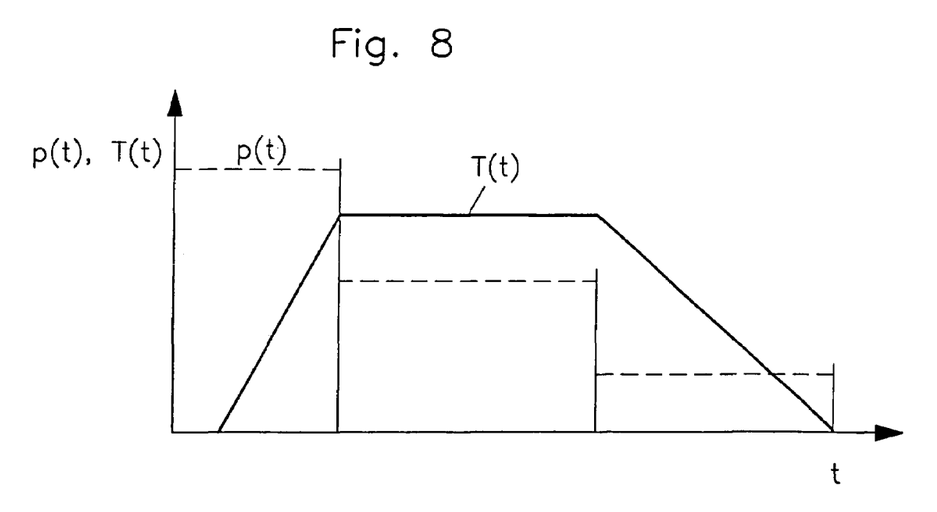
FIG. 8 shows a time-based cure.

FIG. 8 shows additionally an exemplary presentation of the time-dependent heating of a workpiece in a resonator or of many workpieces in a processing line. First, the workpiece is heated up linearly along a ramp while the highest microwave energy is in-coupled. Then the temperature is maintained constant over a predetermined time interval that is the radiation heat losses of the workpiece must be compensated for by microwave in-coupling. For this procedure, less electromagnetic energy is needed than for the heating. At the end finally, a predetermined linear cool-down procedure is followed. The radiation losses are not fully compensated for. For this procedure, still less energy is needed than for maintaining the temperature constant. The temperature and energy input curves are shown in FIG. 8 in an exemplary and only qualitative manner. By way of devices, well-known in control engineering, such processes are run supported by computers (internally HEPHAISTOS). The momentary state of the work piece or the work pieces is determined by temperature sensors positioned at the work pieces or by way of a heat camera which can eventually be calibrated and is processed in a computer for the control procedure.

Figure 9:
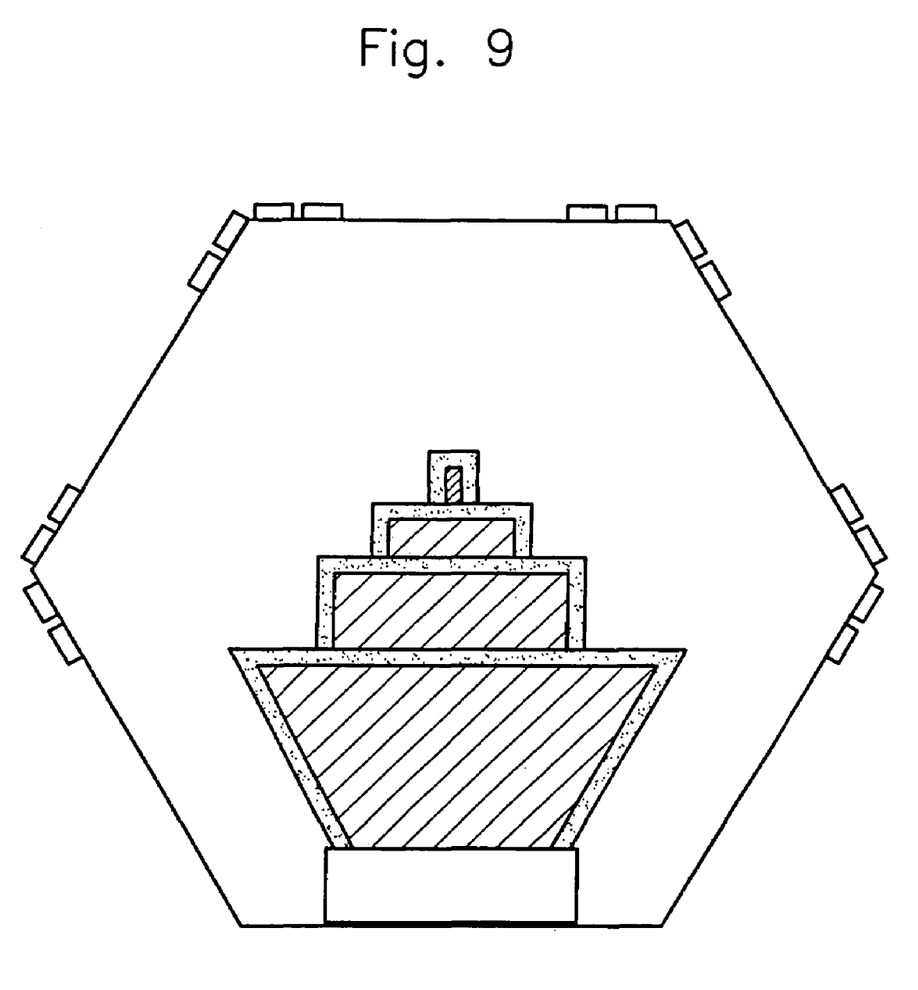
FIG. 9 shows a metal body coated with a resin to be cured.

The importance of the homogeneous field distribution in the central process volume of the resonator is pointed out and explained on the basis of FIG. 9. Metallic objects are problematic in a microwave apparatus for a household and the respective operating manuals point out that they should not be placed into the resonator. The field distribution based on the resonator dimensions in the wavelength $\lambda$ is 12 cm wherein a microwave apparatus for the household is inhomogeneous. Rotating plates in some better apparatus or uneven heating in more simple apparatus point this out indirectly.

Coating objects with a layer in order to protect the objects for example from environmental influences is a technical finishing procedure often used. To coat for example a metallic housing completely and without gaps with an epoxy resin layer is problematic as far as expenditures are concerned. It is problematic because the resin layer must be cured. In this case, the importance of the homogeneous field distribution in the central process volume with in the resonator is apparent. A metal housing can be subjected in such a process volume to radiation without danger because, as a result of the homogeneous field distribution, there are no field components parallel or tangential to the metal surface which would induce currents in the metal wall of the housing, but the layer deposited on the metal surface is fully immersed in this field so that the layer volume is uniformly heated. This occurs volumetrically from within and not via the layer surface as it occurs with conventional thermal heating procedures in autoclaves or by infrared irradiation.

Large metal housings such as ship bodies can be provided with a cured epoxy resin layer for example in a prismatic resonator of hexagonal cross-section.

The resonator dimensions concerning the diameter and the length are in the range of many meters. The resonator is a metal sheet housing along which an in-coupling structure part is provided which extends along one of the housing segment longitudinal edges. Such an in-coupling structure pair is arranged symmetrically to the longitudinal edge thereof and has several in-coupling structures, in this case, for example two, in order to couple sufficient microwave energy into the resonator. With the dimension being in the range of many meters, with a microwave of 915 MHz, equivalent to 31 cm wavelength, a sufficient field homogeneity in the process volume can be achieved. The stylized ship body, see a front view in FIG. 9, is disposed fully within the process volume. The resin layer applied uniformly to the whole ship body is cured without local hotspots in a qualitative timely course about according to FIG. 8.

The accessibility to the resonator depends on the process to be performed or on the installation of the resonator in a processing line. Therefore, it is accessible at least via a front wall or a wall segment via a door or a sluice or by removal.

It is also possible that certain work pieces must be processed by microwave in a vacuum or under pressure to a greater or smaller degree. So that the structure of the electromagnetic field in the interior of the resonator remains will defined the resonator wall is braced or reinforced on the outside with stiff profile material.

The resonator setup is also determined by the process to be performed. It may therefore be supported with the housing wall and/or the front releasably anchored. For moving, the resonator may be disposed on a sled or a cart for example and is therefore provided at the outside thereof with hooks and ears for its manipulation.

What is claimed is:

1. A microwave resonator for the thermal processing of materials by means of microwaves, comprising a high mode resonator with an even number convex polygonal cross-section having wall segments and planar front sides and longitudinal edges formed between two immediately adjacent wall sections and extending parallel to the longitudinal axis of the resonator, at least two in-coupling structures arranged on said wall segments at opposite sides of, and along, at least one longitudinal wall edge, each in-coupling structure being arranged along a straight guide line which extends parallel to the longitudinal wall edge of the resonator wall, the straight guide line being disposed in spaced relationship to the associated longitudinal wall edge such that the microwave beam coupled thereby into the resonator is reflected with the first reflection by two adjacent wall area segments and divided into two beam parts, wherein:

each in-coupling structure is connected to the end of a rectangular hollow conductor which is associated with a microwave source and carries a microwave in a $TE_{01}$-mode, and the in-coupling structure into the wall area segment consists of a series of non-overlapping equidistant openings in the resonator wall, which are arranged alternately at opposite sides of the respective straight guide line extending parallel to the longitudinal wall edge, the incoupling openings being spaced so as to provide for a phase-constant out-coupling into the resonator of the microwave present in the rectangular hollow conductor in the base mode $TE_{01}$, and the width of the opening being determined approximately from the condition for small refraction angles $\Theta$ with predetermined microwave length $\lambda$ from $\tan \Theta = \lambda/d$ and for very small refraction angles $\Theta$ from $\Theta = \lambda/d$.

2. A microwave resonator according to claim 1, wherein the incoupling openings extend with their longitudinal axes parallel to the straight guide line—for strongest microwave in-coupling—or normal thereto—for weakest microwave in-coupling or somewhere between these two positions.

3. A microwave resonator according to claim 2, wherein the in-coupling openings follow at least approximately over a length $L=\lambda/2$ of the base wavelength the course of two electrical field lines which extend relative to each other in a mirror-reversed fashion, that is, the E-field lines of the base mode $TE_{01}$, in the wall of the rectangular hollow conductor and which are spaced apart in the lobe area by the width d.

4. A microwave resonator according to one of claim 2, wherein the in-coupling openings are equidistant for obtaining phase consistency of the phase to be in-coupled, and the distance of the openings from the guide straight line is such that an isotropic radiation in the distant reflected field is obtained.

5. A microwave resonator according to claim 4, wherein a mode mixer is installed along the wall edge straight line of the two radiation planes of an in-coupling structure pair which extends over the length wall section edge.

6. A method of operating a microwave resonator as claimed in claim 4, comprising the following steps:

providing the power incoupling p(t) of the microwave via the incoupling structure pairs of a resonator selectively corresponding to a provision, increasing with time, constant in time, or decreasing with time, providing additionally selectively for in-coupling of the power $\Sigma p_i(t)$ via the N in-coupling structure pairs in a way so as to oscillate around the predetermined value p(t) and, maintaining a predetermined sum value while the power incouplings are displaced relative to one another so that the stationary mode formation in the resonator oscillates locally synchronously with the oscillation, depending on the number N of the in-coupling structure pairs provided in the resonator wall, between two locations back and forth or moves in the resonator volume around the resonator axis.

7. A method according to claim 6, wherein the in-coupling by way of the in-coupling pair i is uniform or oscillates around the average value $p_i(t)$ of the power incoupling oppositely detuned while maintaining the average value $p_i(t)$.

8. A microwave resonator according to claim 1, wherein the in-coupling openings are rectangular having a width d and at most a length $L=\lambda/2$ of the base wave $_{10}$ in the rectangular hollow conductor.

9. A plant/processing line for the thermal processing of materials by microwaves, with at least two microwave resonators according to claim 1 with incoupling openings which are equidistant for obtaining phase consistency of the phase to be in-coupled and wherein the distance of the openings from the straight guide line is such that an isotropic radiation in the distant reflected field is obtained and which are arranged so as to have adjacent front faces such that through a passage between the two adjacent front faces objects being processed can be transported from one resonator to the other.

* * * * *